US010816687B2

(12) United States Patent
Sain

(10) Patent No.: US 10,816,687 B2
(45) Date of Patent: Oct. 27, 2020

(54) METHOD FOR ESTIMATING PETROPHYSICAL PROPERTIES FOR SINGLE OR MULTIPLE SCENARIOS FROM SEVERAL SPECTRALLY VARIABLE SEISMIC AND FULL WAVEFIELD INVERSION PRODUCTS

(71) Applicant: Ratnanabha Sain, Houston, TX (US)

(72) Inventor: Ratnanabha Sain, Houston, TX (US)

(73) Assignee: ExxonMobil Upstream Research Company, Spring, TX (US)

( * ) Notice: Subject to any disclaimer, the term of this patent is extended or adjusted under 35 U.S.C. 154(b) by 478 days.

(21) Appl. No.: 15/788,594

(22) Filed: Oct. 19, 2017

(65) Prior Publication Data

US 2018/0156932 A1    Jun. 7, 2018

Related U.S. Application Data

(60) Provisional application No. 62/429,475, filed on Dec. 2, 2016.

(51) Int. Cl.
*G01V 1/30* (2006.01)
*G01V 99/00* (2009.01)
(Continued)

(52) U.S. Cl.
CPC .............. *G01V 1/306* (2013.01); *G01V 1/282* (2013.01); *G01V 11/00* (2013.01); *G01V 99/005* (2013.01);
(Continued)

(58) Field of Classification Search
None
See application file for complete search history.

(56) References Cited

U.S. PATENT DOCUMENTS 6,522,973 B1    2/2003    Tonellot et al.
8,126,651 B2    2/2012    Saltzer et al.
(Continued)

OTHER PUBLICATIONS

Guozhong, Gao et al. (2012) "Joint Petrophysical Inversion of Electromagnetic and Full-Waveform Seismic Data," *Geophysics*, v. 77, No. 3, May-Jun. 2012, p. WA3-WA18.
(Continued)

*Primary Examiner* — Gregory J Toatley, Jr.
*Assistant Examiner* — Terence E Stifter, Jr.
(74) *Attorney, Agent, or Firm* — ExxonMobil Upstream Research Company—Law Department

(57) ABSTRACT

A computer-implemented method for determining rock and fluid parameters of a subsurface region from measured seismic reflection data, said method including: generating, with a computer, a geophysical data volume by combining a plurality of angle stacks obtained from the measured seismic reflection data and geophysical property data obtained from a full wavefield inversion of the measured seismic reflection data; for each point of the geophysical data volume, determining, with a computer, a petrophysical model that is a probability of a rock state based on initial values of the rock and fluid parameters and the geophysical data volume; iteratively determining, using a computer, updated values for the rock and fluid parameters, wherein the iteratively determining includes determining a petrophysical parameter estimate for the rock and fluid parameters from the petrophysical model as constrained by the geophysical data volume and the initial values of the rock and fluid parameters, minimizing a misfit between the geophysical data volume and synthetic data generated from a forward modeling of the initial values of the rock and fluid parameters using a cost function that includes the petrophysical parameter estimate of the rock and fluid parameters, and repeating the iteratively determining until a predeter-
(Continued)

mined stopping criteria is satisfied and final values for the rock and fluid parameters are generated, and each subsequent iteration of the iteratively determining replaces the initial values for the rock and fluid parameters with the updated values for the rock and fluid parameters from a previous iteration; determining, with a computer, uncertainty in the final values for the rock and fluid parameters; and exploring for or producing hydrocarbons using the final values for the rock and fluid parameters and there uncertainty.

14 Claims, 3 Drawing Sheets

(51) Int. Cl.
    *G01V 11/00*     (2006.01)
    *G01V 1/28*     (2006.01)
    *G01V 1/40*     (2006.01)

(52) U.S. Cl.
    CPC ........ *G01V 1/40* (2013.01); *G01V 2210/6163* (2013.01); *G01V 2210/6165* (2013.01); *G01V 2210/622* (2013.01); *G01V 2210/6244* (2013.01); *G01V 2210/632* (2013.01); *G01V 2210/679* (2013.01)

(56) References Cited

U.S. PATENT DOCUMENTS

| | | | |
|---|---|---|---|
| 8,537,638 B2 | 9/2013 | Lee et al. | |
| 2010/0185422 A1* | 7/2010 | Hoversten | G01V 11/00 703/2 |
| 2011/0255371 A1* | 10/2011 | Jing | G01V 1/28 367/73 |
| 2015/0120196 A1* | 4/2015 | Li | G01V 1/306 702/13 |
| 2015/0301223 A1* | 10/2015 | Xu | G01V 1/306 703/2 |
| 2016/0349389 A1* | 12/2016 | Walters | G01V 1/50 |

OTHER PUBLICATIONS

Lien, Martha (2013) "Simultaneous Join Inversion of Amplitude-Versus-Offset and Controlled-Source Electromagnetic Data by Implicit Representation of Common Parameter Structure," *Geophysics*, v. 78, No. 4 (Jul.-Aug. 2013), p. ID15-ID27.
Aki et al. (1980), "Quantitative Seismology, Theory and Methods," Chapter 5.2, W.H. Freeman & Co., pp. 133-155.
Avseth, P., et al. (2010) "Rock-physics diagnostics of depositional texture diagenetic alteration, and reservoir heterogeneity in high-porosity siliciclastic sediments and rocks—A review of selected models and suggested work flows", *Geophysics*, vol. 75, No. 5 pp. A31-A47.
Bosch, et al., (2010) "Seismic inversion for reservoir properties combining statistical rock physics and geostatistics: a review", *Geophysics* 75, pp. A165-A176.
Brac, J., et al., (1992) "Inversion with a priori information: an approach to integrated stratigraphic interpretation", *Reservoir Geophysics*, ed. Sheriff, pp. 841-844.
Castagna, J. P. et al. (1993) "Offset-dependent reflectivity-theory and practice of AVO analysis", *Investigation in Geophysics Series*, vol. 8, Society of Exploration *Geophysicists*, pp. 3-36.
Cooke, D., et al. (1983) "Generalized linear inversion of reflection seismic data", *Geophysics* 48, pp. 665-676.
Gunning, J., et al., (2013) "A tour of optimization methods for facies estimation in AVO seismic inversion using Markov Random Fields", 75th EAGE Conference & Exhibition incorporating SPE EUROPEC 2013,5 pages.
Helgesen, J. et al., (1993) "Estimation of elastic parameters from AVO effects in the Tau-P Domain", *Geophysical Prospecting* 41, pp. 341-355.
Jeong, C. et al. (2014) "Modeling geological scenario uncertainty from seismic data using pattern similarity". *SEG Technical Program Expanded Abstracts*, SEG Denver Annual Meeting, pp. 2444-2448.
Landro, M et al. (1995) "Target-oriented AVO inversion of data from Valhall and Hod fields," The Leading Edge, 855-861 (1995).
Lortzer, G. (1992) "An integrated approach to lithologic inversion—Part I: Theory", *Geophysics* 57, Issue 2, pp. 233-244.
Martinez, et al., (1992) "Complex Reservoir Characterization by Multiparameter Constrained inversion", *Reservoir Geophysics*, ed. By Sheriff, pp. 224-234.
Oldenburg, D. W., et al. (1983), "Recovery of the acoustic impedance from reflection seismograms" *Geophysics*, vol. 48, Issue 10, pp. 1318-1337.
Pan, G. S. et al.,(1994) "An integrated target-oriented prestack elastic waveform inversion", *Geophysics* 59, No. 9, pp. 1392-1404.
Rimstad, J. et al., (2012) "Hierarchical Bayesian lithology/fluid prediction: A North Sea case study", *Geophysics* 77, No. 2, pp. B69-B85.
Scheidt, C. et al. (2015). "Probabilistic falsification of prior geologic uncertainty with seismic amplitude data: Application to a turbidite reservoir case." *Geophysics*, 80(5), pp. M89-M100.
Simmons, J. et al. (1996) "Waveform-based AVO inversion and AVO prediction-error", *Geophysics* 61, Issue 6, pp. 1575-1588.
Stolt, R.H. et al. (1985) "Migration an dinversion of seismic data", *Geophysics*, vol. 50, No. 12; pp. 2458-2472.
Tarantola, A. (1984) "Inversion of seismic reflection data in the acoustic approximation," *Geophysics* 49, No. 8, pp. 1259-1266.
Yilmaz, O (2001) "Chapter 2. Deconvolution", *Seismic Data Analysis: Processing, Inversion, and Interpretation of Seismic Data*, Second Edition, pp. 159-270.

\* cited by examiner

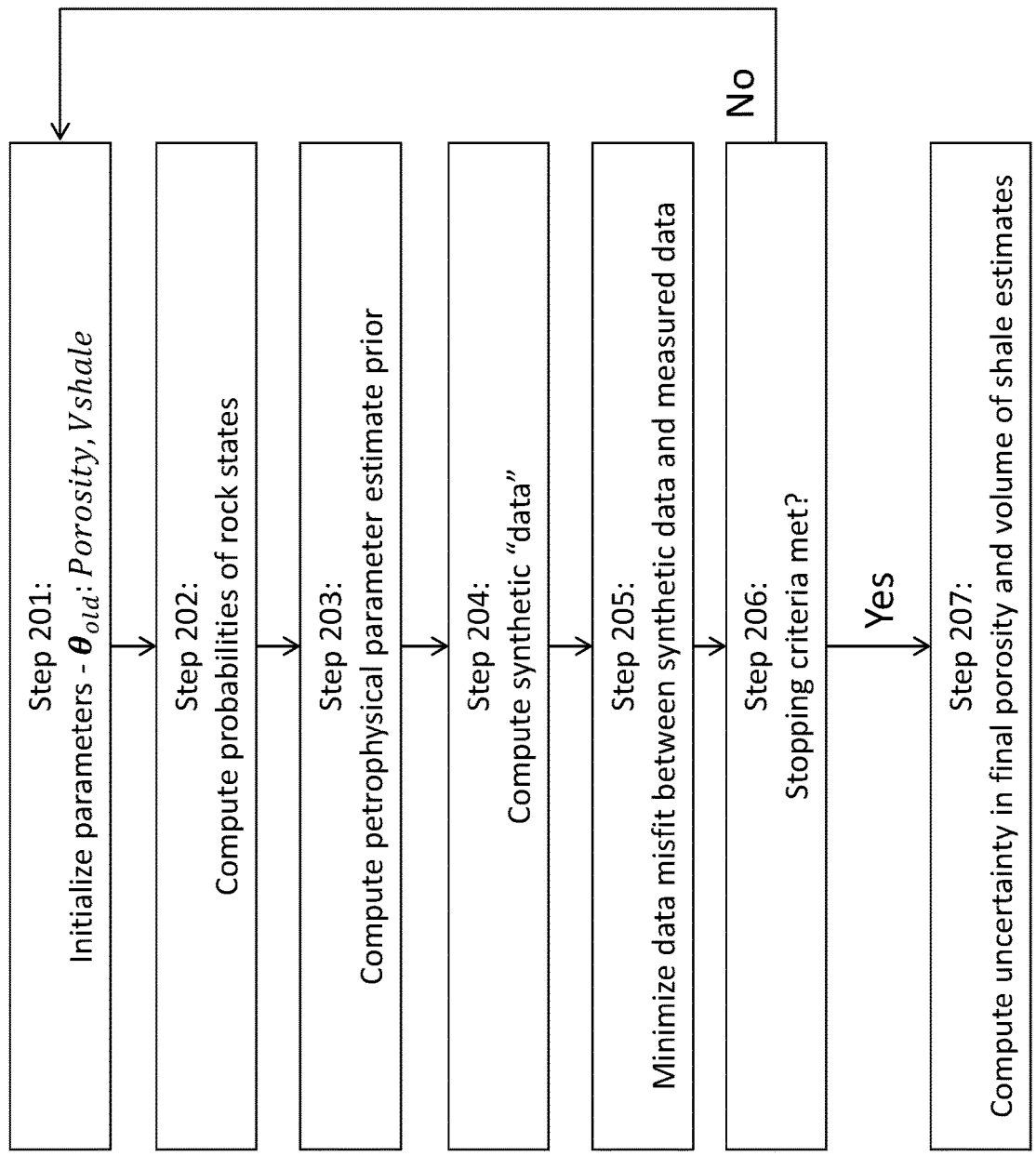

METHOD FOR ESTIMATING PETROPHYSICAL PROPERTIES FOR SINGLE OR MULTIPLE SCENARIOS FROM SEVERAL SPECTRALLY VARIABLE SEISMIC AND FULL WAVEFIELD INVERSION PRODUCTS

CROSS-REFERENCE TO RELATED APPLICATION

This application claims the benefit of U.S. Provisional Patent Application 62/429,475 filed Dec. 2, 2016 entitled METHOD FOR ESTIMATING PETROPHYSICAL PROPERTIES FOR SINGLE OR MULTIPLE SCENARIOS FROM SEVERAL SPECTRALLY VARIABLE SEISMIC AND FULL WAVEFIELD INVERSION PRODUCTS, the entirety of which is incorporated by reference herein.

TECHNOLOGICAL FIELD

This disclosure relates generally to the field of characterizing hydrocarbon reservoirs, and more particularly, to lithology inversion and methods for predicting sand (or shale) volume and porosity in sub-surface rocks. Specifically, the disclosure relates to a method for estimating petrophysical properties of subsurface rocks from multiple datasets with variable spectral content such as seismic, non-seismic and full wavefield inversion products for single or multiple scenarios.

BACKGROUND

This section is intended to introduce various aspects of the art, which may be associated with exemplary embodiments of the present invention. This discussion is believed to assist in providing a framework to facilitate a better understanding of particular aspects of the present invention. Accordingly, it should be understood that this section should be read in this light, and not necessarily as admissions of prior art.

In characterizing subsurface rocks and hydrocarbon reservoirs, estimating hydrocarbon reserves, safely drilling wells and developing models for how to best extract hydrocarbons, it is essential to infer the petrophysical rock properties such as lithology (for example, relative amounts of shale and sand) and associated porosity. We will mention clay and shale interchangeably with the recognition that they are not strictly the same from a mineralogical standpoint. For our current purpose, we treat clay or shale as one of the volumetric mineral end-members of subsurface rocks, the other one being sand. The choice of mineral end-members can depend on subsurface geology. Hydrocarbons (e.g., oil or gas) that are located in sand that is low porosity or poorly connected are much harder to drain than higher porosity, blocky sands. Hence, inferring spatial distribution of petrophysical properties is critical in appraising, developing and producing a reservoir.

Petrophysical rock properties such as proportion of sand/shale and their porosity can be measured from drilled wells or boreholes, but such information is typically sparse due to the expense of drilling, logging and coring these wells. Hence, well data alone does not allow us to infer spatially continuous petrophysical property estimates. Nevertheless, direct borehole measurements and/or subsequent core analysis from such wells provide ground truth measurements and are used to understand rock property relations. Such relations as the ones between petrophysical properties and acoustic properties (compressional- and shear-wave velocities) are the bedrock for inferring spatially variable petrophysical properties from geophysical data such as seismic. Seismic data is obtained by sending acoustic waves through the subsurface and then recording the reflected waves that are returned. This process enables us to obtain an image of the subsurface called the seismic reflectivity. As part of the data processing, the reflectivity profiles are often organized to form regularly spaced lines in two orthogonal directions that together comprise a 3-dimensional volume of the earth.

Broadly, two categories of relationships or mathematical models are required to relate petrophysical properties to seismic data. The first category of mathematical models is referred to as rock physics models (RPMs). RPMs, most commonly, relate petrophysical rock properties, such as porosity, volume of shale, and fluid (hydrocarbon or water) content to geophysical rock properties, such as compressional (or P-wave) and shear (or, S-wave) velocities, and density. Geophysical rock properties depend on elastic rock properties such as bulk and shear moduli. RPMs, like other mathematical models, can be either inductive (or, empirical) or deductive (or, theoretical). Regardless of the nature of these RPMs, they require calibration using direct well-bore measurements and collocated seismic data. Avseth et al. (2009) present a wide collection and background of such relations. The second category of mathematical models is referred to as angle-dependent amplitude models. The amplitudes of reflected seismic waves that have traveled through the subsurface are related to changes in the geophysical properties of the rocks between one layer and the next, as well as the angle of incidence with which the wave impinged on the boundary. Consequently, changes in amplitude as a function of receiver offset (AVO) can be used to infer information about these elastic properties. To take advantage of this phenomenon, subsets of seismic reflection data corresponding to particular offsets (or angles) or small groups of offsets (or angles) can be processed into what are called angle stacks. ("Offset" is the distance between a receiver and the seismic source.) Textbooks with the mathematical details of AVO include Aki and Richards, Quantitative Seismology, W. H. Freeman and Co, (1980) and Castagna and Backus, Offset-dependent reflectivity-theory and practice of AVO analysis, Society of Exploration Geophysicists (1993).

Conventional approaches to generate petrophysical properties from seismic angle stacks involve a two-step or sequential or cascaded inversion process. (Inversion is any process whereby for a quantity y known to depend on one or more variables x, the values of x corresponding to measured values of y are inferred.) The first step inversion is called elastic geophysical inversion whereby elastic or geophysical properties are inverted from seismic angle stacks. Details of how to perform elastic inversion are contained in many papers, including D. Cooke and W. Schneider, "Generalized linear inversion of reflection seismic data", Geophysics 48, 665-676, (1983); and J. Helgesen and M Landro, "Estimation of elastic parameters from AVO effects in the Tau-P Domain", Geophysical Prospecting 41, 341-355, (1993); and J. Simmons and M. Backus, "Waveform-based AVO inversion and AVO prediction-error", Geophysics 61, 1575-1588, (1996). The second step inversion is called petrophysical inversion whereby petrophysical properties are inverted from geophysical properties. Other publications describe methods of relating elastic parameters obtained in elastic inversion to the lithologic parameters of interest, for example, G. Lortzer and Berkhout, "An integrated approach to lithologic inversion-Part I: Theory", Geophysics 57, 233-244 (1992). Some publications discuss both pieces together-elastic inversion followed by some sort of lithology inversion or transformation, for example, Pan, et al., "An integrated target-oriented prestack elastic waveform inversion", Geophysics 59, 1392-1404 (1994); Martinez, et al., "Complex Reservoir Characterization by Multiparameter Constrained inversion", Reservoir Geophysics, ed. By Sheriff, 224-234, (1992); J. Brac, et al., "Inversion with a priori information: an approach to integrated stratigraphic interpretation", Reservoir Geophysics, ed. Sheriff, p 251-258, (1992); and M. Landro and A. Buland, "Target-oriented AVO inversion of data from Valhall and Hod fields," The Leading Edge, 855-861 (1995). More recent methods use seismic angle stacks to jointly invert for elastic or geophysical parameters and subsurface rock types or lithofacies, for example, Rimstad et al., "Hierarchical Bayesian lithology/fluid prediction: A North Sea case study", Geophysics 77, B69-B85, (2012); and Gunning et al., "A tour of optimization methods for facies estimation in AVO seismic inversion using Markov Random Fields", $75^{th}$ EAGE Conference & Exhibition incorporating SPE EUROPEC 2013. Further, Bosch, et al., "Seismic inversion for reservoir properties combining statistical rock physics and geostatistics: a review", Geophysics 75, A165-A176 (2010) provides a nice review of various different methods in this technology area.

One aspect of seismic angle stack data is that they are "bandlimited" in nature. This is largely due to the fact that the seismic wavelet is bandlimited and lacks both the low and high frequencies. Extending our earlier depiction of seismic data as seismic reflectivity (geophysical property contrasts between adjacent layers), we introduce the effect of seismic wavelet. In reality, the amplitudes in seismic data are a mathematical combination-called convolution—of reflectivity and wavelet. This wavelet is bandlimited, and hence seismic data is bandlimited. The use of the word band is typically with reference to seeing the subsurface rock property variation in terms of a frequency spectrum. Each seismic angle stack is not only bandlimited, but has differences in the frequency band they cover or, in other words, are spectrally variable. The bandlimited nature or the lack of low frequencies in data poses a significant challenge in generating "absolute" petrophysical property estimates of subsurface rocks and restricts us to only generating the relative changes in petrophysical properties. The quest for measuring, estimating, or retrieving low frequency information to be able to provide absolute instead of bandlimited property estimates is an on-going field of research. One significant breakthrough is the use of Full Wavefield Inversion products as "data" for low frequency. Full Wavefield Inversion (FWI) is a seismic method capable of utilizing the full seismic record, including the seismic events that are treated as "noise" by standard inversion algorithms. FWI is a computer-implemented geophysical method that is used to estimate subsurface geophysical properties such as velocity or acoustic impedance. Details about the implementation and use of FWI can be found in U.S. Pat. No. 8,537,638, titled "Methods for Subsurface Parameter Estimation in Full Wavefield Inversion and Reverse Time Migration" and A. Tarantola, "Inversion of seismic reflection data in the acoustic approximation," Geophysics 49, 1259-1266 (1984), the entirety of both of which are hereby incorporated by reference. The use of FWI products for quantitative inference of petrophysical properties pose a challenge in terms of using another spectrally variable data input, which may or may not have overlap with seismic angle stack amplitude data.

Another key aspect of petrophysical inversions is the evaluation of uncertainty and non-uniqueness. As observed by Bosch et al (2010), it is important to note that the band limited nature of the seismic data, in addition to the observational and modeling uncertainties, gives rise to the inherent non-uniqueness of this seismic-to-petrophysical property inversion. For every data measurement and every mathematical model used in such (and any) inversion methods, there is an estimate of error or uncertainty. Such uncertainty estimates need to be propagated to the petrophysical properties being evaluated for the purpose of risk assessment. Not only does this step require an assessment of uncertainty in data and "models" (forward mathematical models), the inversion strategy needs to be adequate for assessing such uncertainty. Typically, a Bayesian framework is well-suited for such analysis.

We evaluate existing petrophysical inversion methods with respect to three main criteria:

(1) Ability to invert absolute band petrophysical property estimates, where "absolute" can be defined qualitatively as the sum of low frequencies (lower than seismic data frequencies) and mid frequencies (or, seismic band frequencies);

(2) Ability to propagate uncertainties in data and parameters to derive posterior uncertainty estimates around petrophysical parameter inversion solutions; and (3) Ability to assess multiple geologic and geophysical scenarios within the limits of seismic-scale variations.

In terms of ability to generate absolute petrophysical property estimates, existing methods using bandlimited input data, such as multiple seismic angle stacks, need low frequency models for each of the model parameters (petrophysical properties). Typically, these low frequency models are built by propagating well-data along some interpreted horizons in which case low frequency seismic velocities are used via interpolation or geostatistical methods eg., Oldenburg (1983), Tonellot et al (2003) US patent "Method for 2D or 3D modeling of a heterogeneous medium such as the subsoil described by one or more physical parameters". Most of such existing methods are developed and implemented for geophysical parameters. Some of these methods can be extended for petrophysical properties with limitations which are discussed as follows. The approach of building low frequency models (LFMs) for porosity and vshale is challenging and even impossible in places with very limited number of wells and interpreted horizons or surfaces. Early business stages of exploring and appraising of hydrocarbon resources and developing such assets have these limiting conditions of sparsity of well and interpretations. Hence, the necessity of surfaces and/or adequate amount of well-data to propagate and build a reliable, three dimensional petrophysical property low frequency model is a practical hindrance to the usage of such methods. Often times, such methods use seismic velocities to propagate the well data away from the well-control. In fact, most commonly the low frequency models are limited to the resolution of conventional seismic velocities which commonly leaves a spectral gap between the low frequency seismic velocities and bandlimited seismic angle stacks. Hence, there is typically a spectral gap in inverted petrophysical properties as well, where the well-data-based model extrapolation fills the gap. These are practical limitations of using existing approaches for generating absolute petrophysical property estimates.

In terms of ability to propagate uncertainty to final petrophysical property estimates, very few seismic-scale methods exist currently. Bosch et al (2010) and Doyen (2007) reviews existing work in this field. However, most of these methods relate to sub-seismic scales. Further such methods largely focus on generating uncertainty of properties for a single geologic scenario, which may not cover the entire uncertainty range. For existing methods working in seismic-scale, there are two key problems:
1. Uncertainty propagation in terms of model parameters (petrophysical properties) is largely dependent on rock types, in addition to data quality. For the former aspect (rock types), there needs to be a formal method of estimating rock types which is missing in current methods; and
2. Some earlier methods rely on expensive computational methods, such as Markov chain Monte Carlo sampling.

Further description of conventional technology can be found in U.S. Pat. No. 8,126,651, titled "Method For Obtaining Porosity and Shale Volume From Seismic Data", the entirety of which is hereby incorporated by reference.

SUMMARY

A computer-implemented method for determining rock and fluid parameters of a subsurface region from measured seismic reflection data, the method including: generating, with a computer, a geophysical data volume by combining a plurality of angle stacks obtained from the measured seismic reflection data and geophysical property data obtained from a full wavefield inversion of the measured seismic reflection data; for each point of the geophysical data volume, iteratively determining, with a computer, a petrophysical model that is a probability of a rock state based on initial values of the rock and fluid parameters and the geophysical data volume; iteratively determining, using a computer, updated values for the rock and fluid parameters, wherein the iteratively determining includes determining a petrophysical prior for the rock and fluid parameters from the petrophysical model as constrained by the geophysical data volume and the initial values of the rock and fluid parameters, minimizing a misfit between the geophysical data volume and synthetic data generated from a forward modeling of the initial values of the rock and fluid parameters using a cost function that includes the petrophysical parameter estimate of the rock and fluid parameters, and repeating the iteratively determining until a predetermined stopping criteria is satisfied and final values for the rock and fluid parameters are generated, and each subsequent iteration of the iteratively determining replaces the initial values for the rock and fluid parameters with the updated values for the rock and fluid parameters from a previous iteration; determining, with a computer, uncertainty in the final values for the rock and fluid parameters; and exploring for or producing hydrocarbons using the final values for the rock and fluid parameters and there uncertainty.

In the method, the rock and fluid parameters can be porosity and Vshale.

In the method, the geophysical property data obtained from the full wavefield inversion can provide for a low frequency component of the rock and fluid parameters that is lower in frequency than the angle stacks.

In the method, the geophysical property data can be obtained from seismic tomography.

In the method, the geophysical property data can be resistivity as derived from CSEM data.

In the method, the geophysical property data can be density as derived from gravity data.

In the method, each iteration of the iteratively determining learns the low frequency component by re-computing the petrophysical model and re-computing the petrophysical parameter estimate using the updated values for the rock and fluid parameters from the previous iteration.

In the method, the determining the petrophysical model can use a Forward-Backward method.

In the method, the Forward-Backward method can include a hidden Markov chain that is used in the determining of the petrophysical model.

In the method, the determining the petrophysical model can include evaluating multiple scenarios that correspond to model structure differences due to geologic and geophysical variations.

In the method, the forward modeling of the initial values of the rock and fluid parameters can include using a forwarded physics operator that is based on a rock physics model that links petrophysical properties to geophysical properties.

In the method, the exploring for or producing hydrocarbons can include causing a well to be drilled based on the final values for the porosity and Vshale and their uncertainty.

In the method, the geophysical data volume can have variable frequency data content with or without overlap.

In the method, the geophysical property data can be P- and/or S-velocity, impedance, or density.

BRIEF DESCRIPTION OF THE DRAWINGS

While the present disclosure is susceptible to various modifications and alternative forms, specific example embodiments thereof have been shown in the drawings and are herein described in detail. It should be understood, however, that the description herein of specific example embodiments is not intended to limit the disclosure to the particular forms disclosed herein, but on the contrary, this disclosure is to cover all modifications and equivalents as defined by the appended claims. It should also be understood that the drawings are not necessarily to scale, emphasis instead being placed upon clearly illustrating principles of exemplary embodiments of the present invention. Moreover, certain dimensions may be exaggerated to help visually convey such principles.

FIG. 3 illustrates an exemplary method of our single scenario parameter inversion approach.

DETAILED DESCRIPTION OF EXAMPLE EMBODIMENTS

Figure 1:
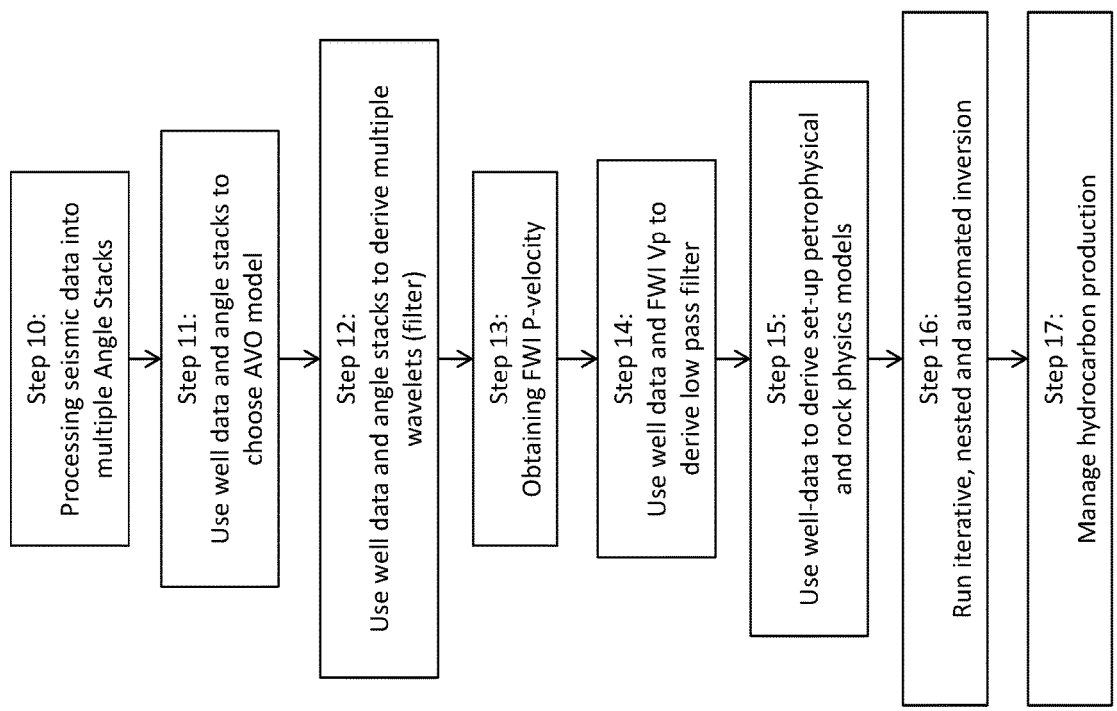
FIG. 1 illustrates an exemplary method embodying the present technological advancement.

Exemplary embodiments are described herein. However, to the extent that the following description is specific to a particular embodiment, this is intended to be for exemplary purposes only and simply provides a description of the exemplary embodiments. Accordingly, the invention is not limited to the specific embodiments described below, but rather, it includes all alternatives, modifications, and equivalents falling within the true spirit and scope of the appended claims.

The present technological advancement relates generally to the field of characterizing hydrocarbon reservoirs and, more particularly, to lithology inversion and methods for predicting petrophysical properties such as sand (or shale) volume and porosity in sub-surface rocks. Specifically, the present technological advancement provides a method for predicting scenario-based petrophysical properties from geophysical products such as seismic data and Full Wavefield Inversion products along with an assessment of uncertainty.

The present technological advancement utilizes Full Wavefield Inversion (FWI) to supply missing low frequency data in conventional petrophysical inversion technology. FWI from marine streamer data can produce P-wave velocity estimates which are higher in frequency than conventional seismic velocity estimates, or ones which fill-up the aforementioned spectral gap. However, the non-uniqueness in inverting P-wave velocity alone to both porosity and vshale prevents us from inverting reliable petrophysical parameter estimates for lower frequencies. The present technological advancement provides a novel approach to simultaneously invert spectrally variable data inputs such as FWI products and seismic AVO angle stacks. Such spectrally variable inputs may or may not have spectral overlap depending on specific examples. This, however, is not a constraint to the application of the current technological advancement. In some embodiments of the application, the geophysical velocity product can be generated using tomographic inversion methods. In yet another embodiment, such geophysical velocity product can be S-wave velocity. In yet another embodiment, such geophysical products can include non-seismic data, including CSEM and gravity, which generates resistivity and density properties respectively. The present technological advancement can also generate petrophysical estimates for single or multiple "scenarios" and, hence, can evaluate the non-uniqueness in such property inversion processes. For each scenario in use, the present technological advancement can generate an average or mean or maximum aposteriori petrophysical property estimate and an assessment of uncertainty. Such uncertainty estimates capture the lack of precise data measurement ("data error") and our inability to model the physical processes accurately ("model structure error").

The present inventor has recognized the following problems with existing approaches for absolute band petrophysical property inversion:

Petrophysical properties using a cascaded two-stage inversion (first stage: geophysical elastic inversion for P-velocity, S-velocity, and density; and second stage: petrophysical inversion): One approach of using high resolution velocity products from FWI for estimating petrophysical properties can use a sequential or two-stage approach where a geophysical inversion is done utilizing high-resolution velocity models. One practical limitation of this approach is that generating S-velocity and density models having same frequency content as FWI P-velocity product requires lithologic information, which is unavailable prior to running an inversion. In addition, mathematically, a two-stage petrophysical inversion results does not have match seismic data as good as a one-stage inversion.

Petrophysical inversion using a one-stage inversion of seismic angle stacks only: One approach for generating absolute band petrophysical properties would require LFMs building LFMs for Porosity and Vshale, and a subsequent inversion of seismic angle stacks using the aforementioned LFMs. The practical limitation of this approach is discussed in earlier sections and relates to the necessity of interpretations and/or well data to build appropriate LFMs;

Petrophysical properties using seismic angle stacks and FWI-derived P-wave velocity: Conventional methods cannot fully honor both data sources in the frequency band where spectral overlap exists.

As previously mentioned, there are limited and cost-intensive methods to generate uncertainty estimates for petrophysical inversions, and none of these methods utilize Full Wavefield Inversion results. In addition to uncertainty estimates, multiple scenarios can be used to explore the non-uniqueness in seismic inversion. The author is not aware of automated methods to generate single or multiple-scenario based inversions of petrophysical parameter estimates. In the context of such considerations, we present our technological advancement starting with a discussion of key terminologies which will be used.

Inverse problems contain three key elements: data, model parameters and model structure. In the realm of petrophysical inversion, these three elements can be described as follows:
 1. Data: Geophysical data such as seismic angle stacks, seismic velocities, resistivity, density, etc.
 2. Model parameters: Petrophysical properties such as porosity, volume of shale, water saturation, lithology, etc.
 3. Model structure: Forward physics or statistical model relating data and model parameters; structure of petrophysical constraints; apriori concepts of porosity and vshale distributions, etc.

The present technological advancement can employ a Bayesian approach to estimate model parameters and their uncertainty for single or multiple model structures. In terms of the current problem in hand, we can re-state the above statements as follows: we employ a Bayesian approach to estimate petrophysical property estimates and their uncertainty for single or multiple geologic or geophysical scenarios. In a Bayesian approach to infer model parameters, the process can start with some a priori knowledge about the distribution of model parameters for a specific model structure and then update the distribution using data to get the posterior distribution. The present technological advancement uses spectrally variable data consisting of FWI and seismic products. The inclusion of spectrally variable data improves the quality of absolute band petrophysical parameter or property estimates. The parameter inversion step can be repeated for multiple model structures, or a distribution of model structures, and the final solution would provide not just the uncertainty in model parameters for a particular model structure, but a range of data-consistent plausible model structures and parameter solutions.

Conventional petrophysical inversions largely ignore the last step of multi-scenario inversions. This step can also be viewed as model structure selection or falsification. This step allows us to explore the inherent non-uniqueness in petrophysical inversion solutions from seismic data. This non-uniqueness stems not just from the limited information we have in seismic data, but also due to the lack of perfect knowledge about geologic scenarios and geophysical forward models.

The present technological advancement can be described in two parts: (1) a method for estimating petrophysical parameters or properties for a single model structure or scenario and (2) extending this method to the generalized case of multiple parameter inversions for multiple scenarios.

As further described below, the present technological advancement can provide three main advantages over existing approaches. The present technological advancement does not require detailed low frequency parameter estimates of porosity and volume of shale. It iteratively learns low frequency components from multi-bandwidth data and parameter constraints. The present technological advancement can use estimates of error in data and forward statistical models to generate uncertainty ranges around inverted petrophysical parameter estimates. The present technological advancement can allow those of ordinary skill in the art to explore non-uniqueness in parameter estimates for multiple scenarios.

Solution for Single Scenario

The present technological advancement can provide a one-stage, iterative and automated method to invert absolute-band porosity and volume of shale from multi-bandwidth, spectrally variable geophysical data. Geophysical data in this case are low frequency seismic velocities, such as ones produced by FWI or seismic tomography, and bandlimited seismic angle stacks, such as ones produced by stacking angle gathers from seismic imaging methods. In another embodiment of the current application, we can use other FWI-related products such as bandlimited elastic impedance, bandlimited shear-wave velocity or bandlimited density with different spectral content. In another embodiment, we can use resistivity and density properties from other non-seismic geophysical data.

The petrophysical estimates can be derived by using an iterative and nested inversion scheme. The nested framework uses a hidden markov model to estimate likelihood of an average or low frequency estimate of petrophysical model parameters, and a subsequent least squares optimization method to reduce the data misfit between recorded data and synthetic data generated from petrophysical property estimates at that iteration. A specific example of hidden markov model would be called Markov chain. A Markov chain is a random process that undergoes transitions from one state to another on a state space (a set of values which a process can take, which can take the form of a transition matrix describing the probabilities of particular transitions and an initial state across the state space). The probability distribution of the next state depends only on the current state and not on the sequence of events that preceded it. The iterative part of the inversion scheme runs various iterations of the nested framework to subsequently obtain the most optimal petrophysical parameter estimate. A statistical model links the different parts of this scheme. For a given scenario or model structure, the complete statistical model includes following terms.

Petrophysical model: This constitutes the hidden Markov model and also serves as parameter constraints. This provides the expected number of subsurface rock states or types. The rock types are further associated with their non-spatial bi-variate, parametric distributions of porosity and volume of shale, and their spatial state transition matrix. The state transition matrix is a square matrix with dimensions of the number of rock states or types and is usually obtained by analysis of well-log data or geologic concept models (e.g., process-geology-based simulations). In another embodiment, the distributions of porosity and volume of shale can have non-parametric and/or spatially variable distributions.

Rock physics model: This links the petrophysical properties (porosity and volume of shale) to geophysical properties (P- and S-wave velocities, density). These relations can be linear, log-linear or non-linear and non-analytical. These relations are typically calibrated using well log data.

Compaction model: This provides the variation of petrophysical parameter constraints (bi-variate distributions of porosity and volume of shale) with depth primarily due to the effect of burial or compaction. This model is not a requisite for the present technological advancement and, when used, can be derived using empirical or theoretical methods. In regions with sparse well-data, basin modeling outputs can be potentially used for compaction models.

AVO model: This links the geophysical properties to angle-dependent reflectivity spikes which are convolved with wavelets or filters to generate bandlimited seismic angle stack response.

Filter model: This converts the angle-dependent reflectivity and absolute-band velocity to bandlimited angle stack synthetics and low-frequency synthetic velocity for comparison with multi-bandwidth geophysical data. The use of low-pass velocity as data for quantitative inversion of rock properties is enabled by reliable higher frequency seismic velocities produced by proprietary FWI. In contrast to older methods, our method enables the use of these velocities by extending the geophysical data representation from bandlimited angle stacks to multi-bandwidth geophysical data. The choice of low-pass and angle-dependent bandlimited filters allows us to simultaneously invert FWI velocities and seismic angle stacks. In other embodiments of this application, we can use alternative FWI products such as bandlimited elastic impedance, bandlimited shear velocity or bandlimited density. Adequate data-specific filters would be used to accommodate such products.

Seismic reflection data are preferably organized into partial angle stacks, each partial angle stack includes reflection data for a limited range of subsurface incidence angles. Typically the range of angles encompassed in such stacks are chosen to be narrow enough so as to minimize the variation in change of the reflection coefficient while at the same time chosen to be broad enough so as to enhance the signal to noise ratio for the stacking. The original offset gathers can also be used with the present technological advancement by mapping the offsets into angles by raytracing through the velocity function used in the data processing. Typically, the data are processed to enhance the PP (P-wave to P-wave reflectivity), and this is the mode that is used to extract the lithology and porosity parameters. However, converted data (P down and S up or vice versa), SS (S-wave down and up) or combinations of PP, SS, PS, and SP reflection data can also be used. In the event that converted mode or SS data are used, it is preferable to process the data into angle stacks and to align the reflecting horizons. Processing the seismic data into stacks is shown as step 10 in the flow chart of FIG. 1. The problem is formulated by treating the recorded seismic data as the convolution of a wavelet with the earth's reflectivity:

$$\text{Wavelet*Reflectivity=Seismic} \tag{1}$$

where the * operator denotes a certain mathematical operation called convolution. Angle-dependent reflectivity can be computed from geophysical properties using different methods with varying amounts of approximations, such as the following derived by R. H. Stolt and A. B. Weglein in "Migration and inversion of seismic data," Geophysics 50, 2458-2472 (1985) as an approximation to "Aki & Richards AVO":

$$Ref(t, \Theta) = \frac{1}{2}(1 + \tan^2\Theta)\frac{\partial}{\partial t}\ln V_p(t) - \\ 4\frac{\overline{V_s}^2}{\overline{V_p}^2}\sin^2\Theta\frac{\partial}{\partial t}\ln V_s(t) + \frac{1}{2}\left(1 - 4\frac{\overline{V_s}^2}{\overline{V_p}^2}\sin^2\Theta\right)\frac{\partial}{\partial t}\ln\rho(t) \tag{2}$$

where Vp, Vs and ρ are expressed as a function of a time-series, t, representing travel-time samples in the subsurface, and Θ is the angle between source and receiver at the same subsurface location, t. Quantities with bar on top represent average between two consecutive layers. The choice of angle-dependent reflectivity model, or AVO model, is shown as Step 11 in FIG. 1. Other choices of AVO models are detailed in Castagna and Backus, Offset-dependent reflectivity-theory and practice of AVO analysis, Society of Exploration Geophysicists (1993).

A wavelet or a filter must be estimated for each stack. (Step 12) A simple method, assuming the data have been processed so as to convert the wavelet to zero-phase, is to compute the Fourier spectrum of the data, set the phase equal to zero, take the inverse Fourier transform, and call that the wavelet. This method assumes that the reflectivity spectrum of the earth is white. More sophisticated methods for inferring wavelets are described in textbooks such as Seismic Data Analysis: Processing, Inversion, and Interpretation of Seismic Data (2001) by Oz Yilmaz. Additionally, well data is used to compute an appropriate scalar to relate seismic amplitudes to reflectivity.

In addition to using angle stacks, the present technological advancement can incorporate hi-resolution Vp (0-15 hz) data generated by an FWI process, as it contains quantitative rock and fluid information. References to "the data" or the geophysical data volume can refer to the combination of the angle stack data and the FWI velocity data. Step 13 can include obtaining such FWI velocity data.

FWI is a seismic method capable of utilizing the full seismic record, including the seismic events that are treated as "noise" by standard inversion algorithms. The goal of FWI is to build a realistic subsurface model by minimizing the misfit between the recorded seismic data and synthetic (or modeled) data obtained via numerical simulation. FWI is a computer-implemented geophysical method that is used to invert for subsurface geophysical properties, such as velocity or acoustic impedance. The crux of any FWI algorithm can be described as follows: using a starting subsurface physical property model, synthetic seismic data are generated, i.e. modeled or simulated, by solving the wave equation using a numerical scheme (e.g., finite-difference, finite-element etc.). The term velocity model or physical property model as used herein refers to an array of numbers, typically a 3-D array, where each number, which may be called a model parameter, is a value of velocity or another physical property in a cell, where a subsurface region has been conceptually divided into discrete cells for computational purposes. The synthetic seismic data are compared with the field seismic data and using the difference between the two, an error or objective function is calculated. Using the objective function, a modified subsurface model is generated which is used to simulate a new set of synthetic seismic data. This new set of synthetic seismic data is compared with the field data to generate a new objective function. This process is repeated until the objective function is satisfactorily minimized and the final subsurface model is generated. A global or local optimization method is used to minimize the objective function and to update the subsurface model. In one embodiment of this technical advancement, we use P-velocities from FWI as a data input. In order to achieve this, we need to understand the frequency or spectral content of FWI P-velocity product. This is done by comparing with P-velocity measured at well location(s). Step 14 involves the derivation of a low pass filter containing the spectral information of FWI P-velocity product. The low pass filter can be adjusted so that the filtered well log data matches or is comparable with the FWI P-velocity data in terms of known statistical methods.

Figure 2:
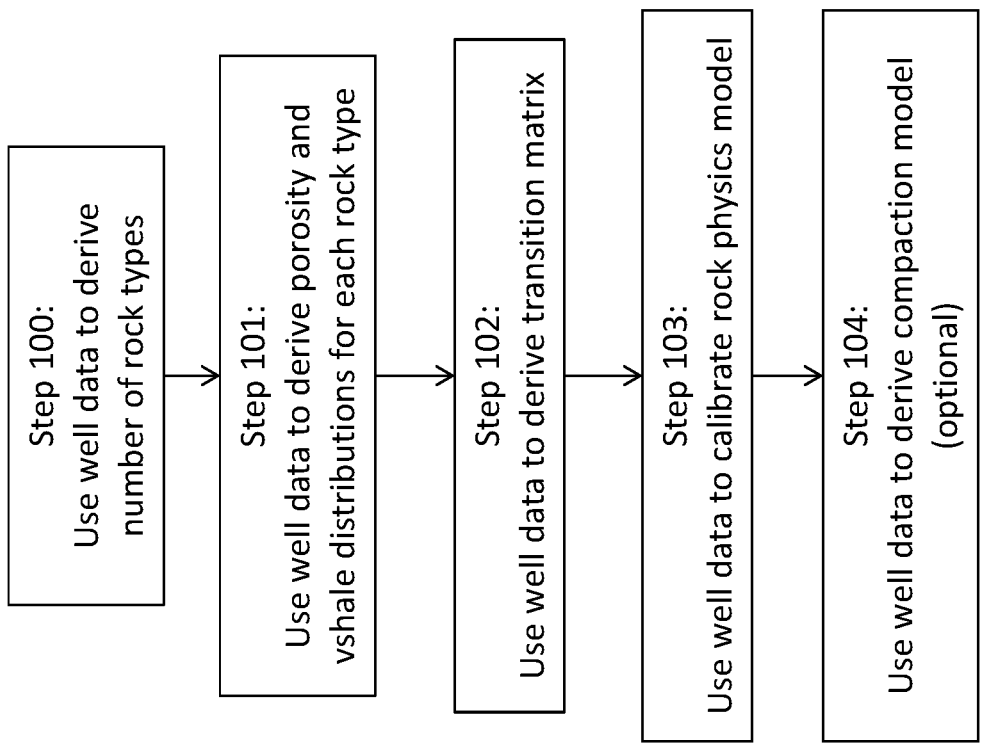
FIG. 2 illustrates an exemplary method of deriving forward statistical models using well data.

Step 15 includes derivation of petrophysical and rock physics models using well-data. FIG. 2 elaborates the steps which allow us to accomplish Step 15. Step 100 can be described as a method to obtain number of rock types from well data. Per Avseth, Mukerji, and Dvorkin, describe a variety of approaches to achieve this step in their article called "Rock-physics diagnostics of depositional texture diagenetic alteration, and reservoir heterogeneity in high-porosity siliciclastic sediments and rocks—A review of selected models and suggested work flows", the entirety of which is incorporated herein by reference. For each of these rock types, parametric or non-parametric statistical distributions are derived for porosity and volume of shale (step 101). In another embodiment of this technological advancement, we change these distributions spatially over the three-dimensional space where this inversion is being performed.

Step 102 includes fitting the parameters of a hidden Markov model to the rock types. In the simplest application, a first order hidden Markov chain is assumed. As explained earlier, such a chain can be described by a transition matrix. Fitting the transition matrix parameters would consist of deriving probabilities of change from one rock type to another in a particular direction, usually vertically upwards. We count the number of times one rock type transitions to itself or a different rock type, and the final count is normalized to derive a transition vector. Such a vector is computed for different rock types to give a transition matrix. In the field of hidden Markov model in statistics, the rock types are analogous to states which are hidden to us and are dependent only on immediately previous state (i.e., Markov characteristic). Hence, the name hidden Markov model.

Step 103 includes deriving coefficients for a rock physics model. In the simplest case, we fit coefficients in the following functional forms relating porosity and volume of shale to geophysical properties:

$$\ln(Vp) = A_1 \phi + B_1 Vsh + C_1$$

$$\ln(Vs) = A_2 \phi + B_2 Vsh + C_2$$

$$\ln(\rho) = A_3 \phi + B_3 Vsh + C_3 \qquad (3)$$

where $A_{1-3}$, $B_{1-3}$ and $C_{1-3}$ are coefficients in a log-linearized Rock Physics Model. The A, B, and C coefficients are constants that may be derived from linear regression of well log data or by applying relationships measured in the lab from rock samples or from simple, linear or linearized rock physics models. Alternate rock physics models can also be used in this step. Such alternate rock physics models are described by Per Avseth, Mukerji, Mavko and Dvorkin, in their article called "Rock-physics diagnostics of depositional texture diagenetic alteration, and reservoir heterogeneity in high-porosity siliciclastic sediments and rocks—A review of selected models and suggested work flows", the entirety of which is incorporated herein by reference.

Step 104 includes deriving compaction relation or model for each rock type and can be used or not used in this technological advancement. The criteria of using this step ties back to Step 101. If the distributions of porosity and volume of shale are similar at different depths of the three-dimensional box where the inversion is being performed, Step 104 is not necessary. Instead, if these distributions are variable enough due to other geologic processes, Step 104 can be used.

Step 16 includes using an iterative, nested and automated inversion method, which learns the low frequency parts of porosity and volume of shale using data and parameter constraints. This method can have direct similarities with an iterative algorithm popular in data analytics and machine learning, which is commonly referred to as Expectation Maximization. This can as well be considered as an iterative, nested optimization algorithm, which seeks to obtain the most likely subsurface petrophysical property model given geophysical data. FIG. 3 illustrates exemplary steps of this method.

In step 201, parameters ($\theta_{old}$: Porosity, Vshale) are initialized, and they can be constant values or spatially variable values dependent on some a priori knowledge.

Step 202, can be described computing the probabilities of rock states or types, S, from current parameter estimates and data. The rock state probabilities can be computed using different methods. A common method, described here, is commonly referred to as the Forward-Backward algorithm. Step 202 can include computing the marginal probability of rock state S for each point, given current parameter estimates ($\theta_{old}$) and measured data ($d_{meas}$) using Forward-Backward method:

$$P(S|\theta_{old}, d_{meas}) \quad (4)$$

Exact equations are discussed below.

These rock state probabilities can be used to compute a low frequency or average or prior model for petrophysical properties collocated in the same grid as the geophysical data. Step 203 can include computing the prior model using bi-variate distributions provided as part of petrophysical model (mean: $\mu_S$ and variance: $\sigma_S$):

$$\sigma_{prior} = \Sigma_S P(S|\theta_{old}, d_{meas}) * \sigma_S; \quad (5)$$

$$\theta_{prior} = \Sigma_S P(S|\theta_{old}, d_{meas}) * \mu_S \quad (6)$$

In step 204, synthetic data is computed using current parameter estimates using a forward physics operator G as follows:

$$d_{syn} = G\theta_{old} \quad (7)$$

where G relates petrophysical parameters to geophysical data. In the linearized case, such a matrix can derived using components described in FIGS. 1 and 2 as follows:

$$G = \left[ \left[ \begin{array}{c} \text{Wavelets} \\ \vdots \\ \text{LowPassFilter} \\ \vdots \end{array} \right] \left[ \text{Aki – Richards} \right] \left[ \text{Derivative} \right] \left[ \text{RPM} \right] \right] \quad (8)$$

In Step 204, the forward modeling operations can include non-linear mathematical models. For example, non-linear AVO models like ones prescribed by Knott-Zoeppritz for isotropic case and ones prescribed by Schoenberg-Protazio for anisotropic case can be used. There are other AVO models which can also be used based on which one is most suitable where suitability is assessed using well data at one or more locations. Non-linear rock physics models with or without any analytical formulation can also be used as part of the forward modeling operation. This choice is also based on analysis of well data at one or more locations.

In Step 205, the data mis-fit is minimized by using a least squares optimization method, such as Quasi-Newton or Steepest Descent. Step 205 can include using computed prior model and its variance, determining a least squares solution to minimize data mis-fit:

$$\theta_{new} = \theta_{old} - (G^T \sigma_s^{-1} G + \sigma_{prior}^{-1})^{-1} * (G^T \sigma_s^{-1} (d_{meas} - d_{syn})) + \sigma_{prior}^{-1} * (\theta_{old} - \theta_{prior}) \quad (9)$$

where $\sigma_s$ indicates data covariance or an estimate of how much to trust the data given coherent and incoherent noise and mismatch due to wrong forward physical model. In one implementation, the same data covariance matrix is used for each seismic inline-crossline location. In an alternative implementation, this is computed separately for each location using the data amplitudes to guide the choice of covariance.

In step 206, if $(d_{meas} - d_{syn}) < \delta$, where $\delta$ is a pre-defined tolerance, the process proceeds to step 206, but otherwise steps 201-204 are repeated using $\theta_{old} = \theta_{new}$ (i.e., this is an iterative process $\theta_i$).

Step 207 can include estimating posterior covariance for parameter estimates using the following equation, which gives the uncertainty in final porosity and volume of shale for a given scenario:

$$\sigma_\theta^{post} = \sigma_{prior} - \sigma_{prior} G^T (G \sigma_{prior} G^T + \sigma_s)^{-1} G \sigma_{prior} \quad (10)$$

Returning to FIG. 1, step 17 includes using the determined values for porosity and vshale to manage hydrocarbon production. As used herein, hydrocarbon management includes hydrocarbon extraction, hydrocarbon production, hydrocarbon exploration, identifying potential hydrocarbon resources, identifying well locations, determining well injection and/or extraction rates, identifying reservoir connectivity, acquiring, disposing of and/or abandoning hydrocarbon resources, reviewing prior hydrocarbon management decisions, and any other hydrocarbon-related acts or activities. For, example, prospecting can include causing a well to be drilled that targets a hydrocarbon deposit derived from the subsurface image. Moreover, the determined values for porosity and vshale can bused for risk assessments for well operations, building better subsurface models, better interpretations of seismic data, drilling better and safer wells with improved pore pressure predictions. Those of ordinary skill in the art know that pore pressure can be predicted from porosity using either the Eaton Ratio Method or the Equivalent Depth Method.

The marginal probabilities of a rock state S given parameter estimates and data, used in Step 202 above, can be derived using the following iterations. This implementation is commonly known as the Forward-Backward algorithm and is an example of belief propagation applied to a Bayesian network corresponding to hidden Markov models, which makes it suitable for the present technological advancement. What follows is a description of an exemplary implementation of this algorithm in the time domain. However, this can as well be done in depth domain in some implementations of this algorithm.

The process starts with the deepest or last time step, t=T. A forward (or upward in the time or depth domain) pass of probability computation for porosity and volume shale for the current iteration is done using a parametric or non-parametric distribution. The joint probability of a rock state, S, at any time t and the sequence of current parameter estimates, $\theta_{old}^T$ to $\theta_{old}^t$ is expressed as:

$$F_t = [\Sigma_{S_{t+1}} F_{t+1} * P(S_t | S_{t+1})] * P(\theta_{old}^t | S_t, d) \quad (11)$$

where $P(\theta_{old}^t | S_t)$ for the case of a normal distribution N can be computed as:

$$P(\theta_{old}^t | S_t, d) \sim N(\mu_S, \sigma_S) = \frac{1}{\sqrt{2\pi(\sigma_S)^2}} e^{-\frac{(\theta_{old}^t - \mu_S)^2}{2(\sigma_S)^2}} \quad (12)$$

and $P(S_t | S_{t+1})$ is the state transition probability matrix.

The backward (or downward in time or depth domain) pass computes the conditional probability as:

$$B_t = \Sigma_{S_{t-1}} B_{t-1} * P(S_{t-1}|S_t) * P(\theta_{old}^{t-1}|S_{t-1}, d) \quad (13)$$

The final marginal probabilities can be computed using the following expression:

$$P(S_t | \theta_{old}, d) = \frac{F_t * B_t}{\Sigma F_t * B_t} \quad (14)$$

Earlier, it was mentioned that the present technological advancement learns the low frequency component of the petrophysical parameter estimates using data and constraints. This learning can be achieved by re-computing $\theta_{prior}$ (which includes the low frequency component) at every iteration of the method described relative to FIG. 2. As can be see, the calculation of $\theta_{prior}$ is influenced by two distinct pieces of information: (1) step 204, where the forward modeling operator G has a low frequency component; and (2) where the rock state information $S_t$ constrains the parameter estimate values.

Solution for Multiple Scenarios

The present technological advancement can also provide a solution for multiple scenarios. In petrophysical inversions, scenarios correspond to model structure differences due to geological and geophysical variations. For example, changes in environment of deposition, changes in rock types, changes in stacking pattern of geologic units, changes in faulting structure, changes in seismic wavelet, changes in rock physics models, etc. can all be considered as of the model structure changes. For each one of these scenarios, the present technological advancement can invert for petrophysical parameters or properties. This step allows us to find evidence in data to falsify scenarios and potentially generate some ideas about the likelihood of some scenarios more than others. In one exemplary implementation, the present technological advancement can be applied to limit the scope of scenarios to the variations detectable within the seismic frequency band and hence, specifically sub-seismic scenario changes do not need to be considered.

For example, the following model structure variations can be considered: (1) number of rock states or types in a specific subsurface interval; (2) bi-variate distributions of petrophysical properties for different rock types; (3) fluid models or scenarios specifying the spatial distribution of different fluid types; (4) prior definitions of proportion of rock states or types typically linked to environment of geologic deposition (EODs); (5) state transition probability matrix; (6) multiple rock physics models; and (7) multiple filter models.

The following two equations demonstrate the concept of evaluating multiple scenarios (Sc).

$$P(\theta|Sc^i, d_{meas}) \sim P(d_{meas}|\theta, Sc^i) * P(\theta|Sc^i) \quad (15)$$

$$P(Sc|d_{meas}) \sim \Sigma_i P(\theta|Sc^i, d_{meas}) * P(Sc^i|d_{meas}) \quad (16)$$

Equation 15 computes the posterior distribution of model parameters ($\theta$: Porosity, Volume of shale, etc.) under a particular model structure or scenario, $Sc^i$. This equation can be referred to as a parameter estimation problem for a given model or scenario structure. This is the same as the earlier discussion for single scenario inversion.

Equation 16 computes the posterior distribution of model parameters and model structure given data. This equation can be referred to as a model or scenario selection problem, and is a robust data driven method to understand the likelihood of scenarios and parameters given a priori knowledge on both.

The first part of the equation 16 is equation 15. This implies that for each scenario, $Sc^i$, we start with a priori concept of petrophysical properties or parameters, and then update these parameters using data. The second part of equation 16 includes an estimate of likelihood of a scenario. This should ideally be estimated using data as well, implying that a scenario that is not consistent with data should have a lower likelihood while selecting scenarios. The following two documents (the entirety of which are hereby incorporated by reference) describe methods to estimate the prior probability of scenario: Céline Scheidt, Cheolkyun Jeong, Tapan Mukerji, and Jef Caers (2015). "Probabilistic falsification of prior geologic uncertainty with seismic amplitude data: Application to a turbidite reservoir case." GEOPHYSICS, 80(5), M89-M12. doi: 10.1190/geo2015-0084.1; and Cheolkyun Jeong, Céline Scheidt, Jef Caers, and Tapan Mukerji* (2014) Modeling geological scenario uncertainty from seismic data using pattern similarity. SEG Technical Program Expanded Abstracts 2014: pp. 2444-2448. doi: 10.1190/segam2014-1092.1.

In all practical applications, the present technological advancement must be used in conjunction with a computer, programmed in accordance with the disclosures herein. Preferably, in order to efficiently perform FWI, the computer is a high performance computer (HPC), known as to those skilled in the art, Such high performance computers typically involve clusters of nodes, each node having multiple CPU's and computer memory that allow parallel computation. The models may be visualized and edited using any interactive visualization programs and associated hardware, such as monitors and projectors. The architecture of system may vary and may be composed of any number of suitable hardware structures capable of executing logical operations and displaying the output according to the present technological advancement. Those of ordinary skill in the art are aware of suitable supercomputers available from Cray or IBM.

The foregoing application is directed to particular embodiments of the present technological advancement for the purpose of illustrating it. It will be apparent, however, to one skilled in the art, that many modifications and variations to the embodiments described herein are possible. All such modifications and variations are intended to be within the scope of the present invention, as defined in the appended claims. Persons skilled in the art will readily recognize that in preferred embodiments of the invention, some or all of the steps in the present inventive method are performed using a computer, i.e. the invention is computer implemented. In such cases, the resulting gradient or updated physical properties model may be downloaded or saved to computer storage.

The invention claimed is:

1. A computer-implemented method for determining rock and fluid parameters of a subsurface region from measured geophysical data, said method comprising:
   generating, with a computer, a geophysical data volume by combining a plurality of angle stacks obtained from the measured geophysical data and geophysical property data obtained from a full wavefield or tomographic inversion of the measured geophysical data, wherein the geophysical property data obtained from the full wavefield or tomographic inversion provides for a low frequency component of the rock and fluid parameters that is lower in frequency than the angle stacks;
   for each point of the geophysical data volume, determining, with a computer, a petrophysical model that is a probability of a rock state based on initial values of the rock and fluid parameters and the geophysical data volume;

iteratively determining, using a computer, updated values for the rock and fluid parameters, wherein the iteratively determining includes determining a petrophysical parameter estimate for the rock and fluid parameters from the petrophysical model as constrained by the geophysical data volume and the initial values of the rock and fluid parameters, minimizing a misfit between the geophysical data volume and synthetic data generated from a forward modeling of the initial values of the rock and fluid parameters using a cost function that includes the petrophysical parameter estimate of the rock and fluid parameters, and repeating the iteratively determining until a predetermined stopping criteria is satisfied and final values for the rock and fluid parameters are generated, and each subsequent iteration of the iteratively determining replaces the initial values for the rock and fluid parameters with the updated values for the rock and fluid parameters from a previous iteration, and wherein each iteration of the iteratively determining learns the low frequency component by re-computing the petrophysical parameter estimate using the updated values for the rock and fluid parameters from the previous iteration;

determining, with a computer, uncertainty in the final values for the rock and fluid parameters; and exploring for or producing hydrocarbons using the final values for the rock and fluid parameters and their uncertainty.

2. The method of claim 1, wherein the rock and fluid parameters are porosity and Vshale.

3. The method of claim 1, wherein the determining the petrophysical model uses a Forward-Backward method.

4. The method of claim 3, wherein the Forward-Backward method includes a hidden Markov chain that is used in the determining of the petrophysical model.

5. The method of claim 1, wherein the determining the petrophysical model includes evaluating multiple scenarios that correspond to model structure differences due to geologic and geophysical variations.

6. The method of claim 1, wherein the forward modeling of the initial values of the rock and fluid parameters includes using a forwarded physics operator that is based on a rock physics model that links petrophysical properties to geophysical properties.

7. The method of claim 2, wherein the exploring for or producing hydrocarbons includes causing a well to be drilled based on the final values for the porosity and Vshale and their uncertainty.

8. The method of claim 1, wherein the geophysical data volume can have variable frequency data content with or without overlap.

9. The method of claim 1, wherein the geophysical property data is velocity, impedance, or density.

10. The method of claim 1, wherein the measured geophysical data is seismic data.

11. The method of claim 1, wherein the inversion is full wavefield inversion.

12. The method of claim 1, wherein the inversion is tomographic inversion.

13. The method of claim 1, wherein the geophysical property data is resistivity and the measured geophysical data is controlled source electromagnetic data.

14. The method of claim 1, wherein the geophysical property data is density and the measured geophysical data is gravity data.

* * * * *